(12) United States Patent  
Sarikaya et al.

(10) Patent No.: US 9,311,298 B2  
(45) Date of Patent: Apr. 12, 2016

(54) BUILDING CONVERSATIONAL UNDERSTANDING SYSTEMS USING A TOOLSET

(71) Applicant: Microsoft Technology Licensing, LLC, Redmond, WA (US)

(72) Inventors: Ruhi Sarikaya, Redmond, WA (US); Daniel Boies, St. Lambert (CA); Larry Heck, Los Altos, CA (US); Tasos Anastasakos, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 196 days.

(21) Appl. No.: 13/923,969

(22) Filed: Jun. 21, 2013

(65) Prior Publication Data

US 2014/0379326 A1    Dec. 25, 2014

(51) Int. Cl.
| | |
|---|---|
| *G10L 15/00* | (2013.01) |
| *G06F 17/28* | (2006.01) |
| *G06F 17/27* | (2006.01) |
| *G10L 15/18* | (2013.01) |

(52) U.S. Cl.
CPC .............. *G06F 17/28* (2013.01); *G06F 17/279* (2013.01); *G10L 15/18* (2013.01)

(58) Field of Classification Search
None
See application file for complete search history.

(56) References Cited

U.S. PATENT DOCUMENTS

| | | | |
|---|---|---|---|
| 6,167,377 A | 12/2000 | Gillick et al. | |
| 6,185,528 B1 | 2/2001 | Fissore et al. | |
| 6,263,308 B1 | 7/2001 | Heckerman | |
| 6,970,947 B2 | 11/2005 | Ebling et al. | |
| 7,835,910 B1 * | 11/2010 | Hakkani-Tur et al. | 704/243 |
| 8,015,006 B2 | 9/2011 | Kennewick et al. | |
| 8,229,729 B2 | 7/2012 | Sarikaya et al. | |

(Continued)

FOREIGN PATENT DOCUMENTS

| | | |
|---|---|---|
| EP | 0553101 B1 | 7/1997 |
| EP | 2575128 A2 | 4/2013 |

(Continued)

OTHER PUBLICATIONS

Bonus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.

(Continued)

*Primary Examiner* — Daniel Abebe
(74) *Attorney, Agent, or Firm* — Danielle Johnston Holmes; Steven Spellman; Micky Minhas

(57) ABSTRACT

Tools are provided to allow developers to enable applications for Conversational Understanding (CU) using assets from a CU service. The tools may be used to select functionality from existing domains, extend the coverage of one or more domains, as well as to create new domains in the CU service. A developer may provide example Natural Language (NL) sentences that are analyzed by the tools to assist the developer in labeling data that is used to update the models in the CU service. For example, the tools may assist a developer in identifying domains, determining intent actions, determining intent objects and determining slots from example NL sentences. After the developer tags all or a portion of the example NL sentences, the models in the CU service are automatically updated and validated. For example, validation tools may be used to determine an accuracy of the model against test data.

20 Claims, 12 Drawing Sheets

(56) References Cited

U.S. PATENT DOCUMENTS

| | | | |
|---|---|---|---|
| 8,275,615 | B2 | 9/2012 | Kozat |
| 8,296,107 | B2 | 10/2012 | Turner et al. |
| 8,321,220 | B1* | 11/2012 | Chotimongkol et al. ..... 704/257 |
| 8,326,634 | B2 | 12/2012 | Di Cristo et al. |
| 8,346,563 | B1 | 1/2013 | Hjelm et al. |
| 8,400,332 | B2 | 3/2013 | Szwabowski et al. |
| 8,412,521 | B2 | 4/2013 | Mathias et al. |
| 8,571,866 | B2 | 10/2013 | Melamed et al. |
| 2002/0083041 | A1 | 6/2002 | Achlioptas |
| 2003/0125948 | A1 | 7/2003 | Lyudovyk |
| 2004/0088726 | A1 | 5/2004 | Ma et al. |
| 2005/0065789 | A1 | 3/2005 | Yacoub |
| 2005/0165598 | A1 | 7/2005 | Cote et al. |
| 2007/0038436 | A1 | 2/2007 | Cristo et al. |
| 2007/0156392 | A1 | 7/2007 | Balchandran et al. |
| 2007/0203863 | A1 | 8/2007 | Gupta |
| 2007/0226649 | A1 | 9/2007 | Agmon |
| 2008/0195388 | A1 | 8/2008 | Bower et al. |
| 2008/0235017 | A1 | 9/2008 | Satomura |
| 2009/0030697 | A1 | 1/2009 | Cerra et al. |
| 2009/0292687 | A1 | 11/2009 | Fan |
| 2010/0004930 | A1 | 1/2010 | Strope |
| 2010/0128863 | A1 | 5/2010 | Krum et al. |
| 2010/0211695 | A1 | 8/2010 | Steinmetz et al. |
| 2010/0312546 | A1 | 12/2010 | Chang et al. |
| 2011/0010171 | A1 | 1/2011 | Talwar et al. |
| 2011/0093459 | A1 | 4/2011 | Dong et al. |
| 2011/0144999 | A1 | 6/2011 | Jang et al. |
| 2011/0153324 | A1 | 6/2011 | Ballinger et al. |
| 2012/0065976 | A1 | 3/2012 | Deng |
| 2012/0084086 | A1 | 4/2012 | Gilbert |
| 2012/0232885 | A1 | 9/2012 | Barbosa et al. |
| 2012/0253802 | A1 | 10/2012 | Heck et al. |
| 2012/0254086 | A1 | 10/2012 | Deng |
| 2012/0254227 | A1 | 10/2012 | Heck et al. |
| 2012/0265531 | A1* | 10/2012 | Bennett ..................... 704/254 |
| 2012/0271617 | A1 | 10/2012 | Nakajima et al. |
| 2012/0290293 | A1 | 11/2012 | Hakkani-Tur et al. |
| 2012/0303565 | A1 | 11/2012 | Deng et al. |
| 2013/0031476 | A1 | 1/2013 | Coin et al. |
| 2013/0085756 | A1* | 4/2013 | Chotimongkol et al. ..... 704/243 |
| 2013/0138436 | A1 | 5/2013 | Yu |
| 2013/0152092 | A1 | 6/2013 | Yadgar |
| 2013/0185065 | A1 | 7/2013 | Tzirkel-Hancock et al. |
| 2014/0025380 | A1 | 1/2014 | Koch et al. |
| 2014/0257803 | A1 | 9/2014 | Yu et al. |
| 2014/0368637 | A1 | 12/2014 | Yeeles |
| 2014/0372112 | A1 | 12/2014 | Xue et al. |
| 2014/0379353 | A1 | 12/2014 | Boies et al. |
| 2015/0100312 | A1 | 4/2015 | Bocchieri |
| 2015/0161993 | A1 | 6/2015 | Sainath |
| 2015/0161994 | A1 | 6/2015 | Tang |
| 2015/0255061 | A1 | 9/2015 | Xue et al. |
| 2015/0255069 | A1 | 9/2015 | Adams et al. |
| 2015/0278191 | A1 | 10/2015 | Levit et al. |
| 2015/0310858 | A1 | 10/2015 | Li et al. |
| 2015/0325236 | A1 | 11/2015 | Levit et al. |

FOREIGN PATENT DOCUMENTS

| | | |
|---|---|---|
| JP | 2002/091477 A | 3/2002 |
| KR | 20130022513 | 3/2013 |
| WO | WO 2005/013262 A1 | 2/2005 |
| WO | WO 2013/171481 A2 | 11/2013 |

OTHER PUBLICATIONS

"Integrated Development Environments for Natural Language Processing", Published on: Oct. 2001, Available at: http://www.textanalysis.com/TAI-IDE-WP.pdf.

Moreira, et al., "Towards the Rapid Development of a Natural Language Understanding Module", In Proceedings of the 10th International Conference on Intelligent Virtual Agents, Jan. 2011, 7 pages.

Seneff, et al., "Galaxy-II: A Reference Architecture for Conversational System Development", In Proceedings of the 5th International Conference on Spoken Language Processing, Nov. 2008, 4 pages.

Dos Reis Mota, Pedro Jose, "LUP: A Language Understanding Platform", A Dissertation for the Degree of Master of Information Systems and Computer Engineering, Jul. 2012, 128 pages.

Sing, et al., "Domain Metric Knowledge Model for Embodied Conversation Agents", In 5th International Conference on Research, Innovation & Vision for the Future, Mar. 5, 2007, 7 pages.

U.S. Appl. No. 13/920,323, filed Jun. 18, 2013, entitled "Restructuring Deep Neural Network Acoustic Models."

U.S. Appl. No. 13/923,917, filed Jun. 21, 2013, entitled "Environmentally Aware Dialog Policies and Response Generation."

U.S. Appl. No. 14/227,492, filed Mar. 27, 2014, entitled "Flexible Schema for Language Model Customization."

U.S. Appl. No. 14/265,110, filed Apr. 29, 2014, entitled "Shared Hidden Layer Combination for Speech Recognition Systems."

U.S. Appl. No. 14/201,704, filed Mar. 7, 2014, entitled "Low-Footprint Adaptation and Personalization for a Deep Neural Network."

U.S. Appl. No. 14/273,100, filed May 8, 2014, entitled "Context Specific Language Model Scale Factors."

Abad, et al., "Context Dependent Modelling Approaches for Hybrid Speech Recognizers", In Proceeding of Interspeech, Sep. 26, 2010, 4 pages.

Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.

Abid, et al., "A New Neural Network Pruning Method Based on the Singular Value Decomposition and the Weight Initialisation", In Proceedings of 11th European Signal Processing Conference, Sep. 3, 2002, 4 pages.

Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.

Chandrasekaran et al., "Sparse and Low-Rank Matrix Decompositions"; IFAC Symposium on System Identification, 2009; 6 pgs.

Chen, Wei, "Building Language Model on Continuous Space using Gaussian Mixture Models", In Proceedings of Research in Language Modeling, Jan. 2007, 66 pages.

Dahl, et al., "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.

Dahl, et al., "Large Vocabulary Continuous Speech Recognition with Context-Dependent DBN-HMMs", In IEEE International Conference on Acoustics, Speech and Signal Processing, May 22, 2011, 4 pages.

Davis, et al., "Low-Rank Approximations for Conditional Feedforward Computation in Deep Neural Networks", In Proceedings of ArXiv preprint arXiv:1312.4461, Dec. 2013, 9 pages.

Deng et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.

Eagle, et al., "Common Sense Conversations: Understanding Casual Conversation using a Common Sense Database", In Proceedings of the Artificial Intelligence, Information Access, and Mobile Computing Workshop, Aug. 2003, 6 pages.

Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.

Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.

He et al; "What is Discriminative Learning"; Achorn International; Jun. 25, 2008; 25 pgs.

(56) References Cited

OTHER PUBLICATIONS

Heck et al.; "Robustness to Telephone Handset Distortion in Speaker Recognition by Discriminative Feature Design"; In Journal of Speech Communication—Speaker Recognition and its Commercial and Forensic Applications, vol. 31, Issue 2-3; Jun. 2000; http://rmcet.com/lib/E-Journals/Speech%20Communication/1-s2.0-S0167639399000771-main.pdf; 12 pgs.
Hinton, et al., "Deep Neural Networks for Acoustic Modeling in Speech Recognition", In IEEE Signal Processing Magazine, vol. 29, Issue 6, Nov. 2012, 27 pages.
Hoffmeister et al., "Log-Linear Model Combination with Word-Dependent Scaling Factors"; Human Language Technology and Pattern Recognition Computer Science Department; Sep. 6-10; Brighton UK; Copyright ©2009 ISCA; 4 pgs.
Huang et al., "Unified Stochastic Engine (USE) for Speech Recognition"; School of Computer Science; 1993 IEEE; 4 pgs.
Jaitly, et al., "An Application of Pretrained Deep Neural Networks to Large Vocabulary Conversational Speech Recognition", In Proceedings of 13th Annual Conference of the International Speech Communication Association, Mar. 12, 2012, 11 pages.
Keshtkar et al., "A Corpus-based Method for Extracting Paraphrases of Emotion Terms"; Proceedings of the NAACL HLT 2010 Workshop on Computational Appraoches to Analysis and Generation of Emotion in Text; Jun. 2010; 10 pgs.
Ko, et al., "Cammia—A Context-Aware Spoken Dialog System for Mobile Environments", In Automatic Speech Recognition and Understanding Workshop, Jul. 29, 2011, 2 pages.
Konig et al., "Nonlinear Discriminant Feature Extraction for Robust Text-Independent Speaker Recognition"; In Proceeding of the RLA2C, ESCA workshop on Speaker Recognition and its Commercial and Forensic Applications; Apr. 1998; http://www.msr-waypoint.com/pubs/193653/konig_heck_DNN.pdf; 4 pgs.
Lecouteux et al., "Dynamic Combination of Automatic Speech Recognition Systems by Driven Decoding"; In Journal of IEEE Transactions on Audio, Speech and Language Processing; Jan. 2013; http://hal.archivesouvertes.fr/docs/00/75/86/26/PDF/SystemCombination.pdf; 10 pgs.
Lee, et al., "Intention-Based Corrective Feedback Generationusing Context-Aware Model", In Proceedings of the Second International Conference on Computer Supported Education, Apr. 7, 2010, 8 pages.
Liao, Hank, "Speaker Adaptation of Context Dependent Deep Neural Networks", In IEEE International Conference on Acoustics, Speech and Signal Processing, May 26, 2013, 5 pages.
Li, et al., "Comparison of Discriminative Input and Output Transformations for Speaker Adaptation in the Hybrid NN/HMM Systems", In Proceedings of 11th Annual Conference of the International Speech Communication Association, Sep. 26, 2010, 4 pages.
Li et al., "Lattice Combination for Improved Speech Recognition"; In Proceedings of the 7th International Conference of Spoken Language Processing; Sep. 16, 2002; http://www.cs.cmu.edu/afs/cs/user/robust/www/Papers/ics1p02_xiang.pdf; 4 pgs.
Lilly, et al., "Robust Speech Recognition Using Singular Value Decomposition Based Speech Enhancement," IEEE Tencon, 1997, 4 pgs.
Liu, et al., "Use of Contexts in Language Model Interpolation and Adaptation", In Journal of Computer Speech and Language vol. 27 Issue 1, Feb. 2009, 23 pages.
Liu, et al., "Language Model Combination and Adaptation using Weighted Finite State Transducers", In Proceedings of IEEE International Conference on Acoustics Speech and Signal Processing, Mar. 14, 2010, 4 pages.
Meinedo et al., "Combination of Acoustic Models in Continuous Speech Recognition Hybrid Systems"; In Proceedings of Sixth International Conference on Spoken Language Processing; Oct. 2000; http://www.inescid.pt/pt/indicadores/Ficheiros/416.pdf; 4 pgs.
Mohamed, et al., "Acoustic Modeling Using Deep Belief Networks", In IEEE Transactions on Audio, Speech, and Language Processing, vol. 20, Issue 1, Jan. , 2012, 10 pages.
Motlicek et al., "Feature and Score Level Combination of Subspace Gaussinasin LVCSR Task"; In IEEE International Conference on Acoustics, Speech and Signal Processing; May 26, 2013; http://ieeexplore.ieee.org/stamp/stamp.jsp?tp=&arnumber=6639142; 5 pgs.
Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.
Sainath, et al., "Auto-Encoder Bottleneck Features Using Deep Belief Networks", In Proceedings of IEEE International Conference on Acoustics, Speech and Signal Processing, Mar. 25, 2012, 4 pages.
Sainath, et al., "Low-Rank Matrix Factorization for Deep Neural Network Training with High-Dimensional Output Targets", In proceedings of IEEE International Conference on Acoustics, Speech and Signal Processing, May 26, 2013, 5 pages.
Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.
Saluja, et al., "Context-aware Language Modeling for Conversational Speech Translation", In Proceedings of Machine Translation Summit XIII, Sep. 19, 2011, 8 pages.
Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.
Sarukkai et al., "Word Set Probability Boosting for Improved Spontaneous Dialog Recognition"; IEEE Transactions on Speech and Audio Processing, vol. 5, No. 5, Sep. 1997; 13 pgs.
Seide, et al., "Conversational Speech Transcription using Context-Dependent Deep Neural Networks", In Proceeding of 12th Annual Conference of the International Speech Communication Association, Aug. 28, 2011, 4 pages.
Singh-Miller et al., "Dimensionality Reduction for Speech Recognition Using Neighborhood Components Analysis"; In Proceedings of 8th Annual Conference of the International Speech Communication Association, Antwerp; Dec. 27, 2007; http://www.cs.columbia.edui~mcollins/papers/ics1p07.pdf; 4 pgs.
Siniscalchi, et al., "Hermitian Based Hidden Activation Functions for Adaptation of Hybrid HMM/ANN Models", In Proceedings of 13th Annual Conference of the International Speech Communication Association, Sep. 9, 2012, 4 pages.
Su et al., "Error Back Propagation for Sequence Training of Context-Dependent Deep Networks for Conversational Speech Transcription"; In IEEE International Conference on Acoustics, Speech, and Signal Processing; May 26, 2013; http://research.microsoft.com/pubs/194345/0006664.pdf; 5 pgs.
Swietojanski et al., "Revisiting Hybrid and GMM-HMM System Combination Techniques"; In Proceeding of the IEEE International Conference on Acoustics, Speech and Signal Processing; May 26, 2013; http://homepages.inf.ed.ac.uk/s1136550/data/Swietojanski_JCASSP2013.pdf; 5 pgs.
Trmal, et al., "Adaptation of a Feedforward Artificial Neural Network Using a Linear Transform", In Proceedings of in Text, Speech and Dialogue, Sep. 10, 2010, p. 8.
Vanhoucke, et al., "Improving the Speed of Neural Networks on CPUs", In Proceedings of NIPS Workshop on Deep Learning and Unsupervised Feature Learning, Dec. 16, 2011, 8 pages.
Xue, et al., "Restructing of Deep Neural Network Acoustic Modles with Singular Value Decomposition", In Proceedings of 14th Annual Conference of the International Speech Communication Association, Aug. 25, 2013, 5 pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363.
Yan et al., "A Scalable Approach to Using DSS-Derived Features in GMM-HMM Based Acoustic Modeling for LVCSR"; In Proceedings of the 14th Annual Conference of the International Speech Communication Association; Aug. 25, 2013; http://homepages.inf.ed.c.uk/s1136550/data/Swietojanski_ICASSP2013.pdf; 5 pgs.

(56) References Cited

OTHER PUBLICATIONS

Yao, et al., "Adaptation of Context-Dependent Deep Neural Networks for Automatic Speech Recognition", In IEEE Spoken Language Technology Workshop, Dec. 2, 2012, 4 pages.

Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.

Yu, et al., "Improved Bottleneck Features Using Pretrained Deep Neural Networks", In Proceedings of 12th Annual Conference of the International Speech Communication Association, Aug. 28, 2011, 4 pages.

Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.

Yu, et al., "Roles of Pre-Training and Fine-Tuning in Context-Dependent DBN-HMMs for Real-Word Speech Recognition", In Proceedings of NIPS Workshop on Deep Learning and Unsupervised Feature Learning, Dec. 2010, 8 pages.

International Search Report and Written Opinion Issued in PCT Application No. PCT/US2014/041014, Mailed Date: Oct. 2, 2014, 9 Pages.

International Search Report and Written Opinion Issued in PCT Application No. PCT/US2014/041023, Mailed Date: Jun. 3, 2015, 17 Pages.

International Search Report and Written Opinion Issued in PCT Application No. PCT/US2015/017872, Mailed Date: Jun. 25, 2015, 11 Pages.

International Search Report and Written Opinion Issued in PCT Application No. PCT/US2015/029334, Mailed Date: Jul. 7, 2015, 12 Pages.

International Search Report and Written Opinion Issued in PCT Application No. PCT/US2015/021921, Mailed Date: Jul. 17, 2015, 11 Pages.

Preliminary Report on Patentability dated Sep. 15, 2015 in Appln No. PCT/US2014/041014, 13 pgs.

U.S. Official Action dated Feb. 27, 2015 in U.S. Appl. No. 13/920,323, 22 pgs.

Response dated May 21, 2015 in U.S. Appl. No. 13/920,323, 15 pgs.

U.S. Official Action dated May 28, 2015 in U.S. Appl. No. 13/923,917, 18 pgs.

U.S. Official Action dated Jul. 1, 2015 in U.S. Appl. No. 14/201,704, 17 pgs.

Response dated Aug. 7, 2015 in U.S. Appl. No. 13/923,917, 10 pgs.

U.S. Official Action dated Aug. 13, 2015 in U.S. Appl. No. 14/227,492, 41 pgs.

U.S. Official Action dated Sep. 24, 2015 in U.S. Appl. No. 13/920,323, 25 pgs.

U.S. Official Action dated Sep. 29, 2015 in U.S. Appl. No. 13/923,917, 9 pgs.

U.S. Official Action dated Oct. 1, 2015 in U.S. Appl. No. 13/920,323, 34 pgs.

Notice of Allowance dated Dec. 15, 2015 in U.S. Appl. No. 13/923,917, 11 pgs.

Notice of Allowance dated Dec. 18, 2015 in U.S. Appl. No. 14/201,704, 15 pgs.

U.S. Official Action dated Jan. 4, 2016 in U.S. Appl. No. 13/920,323, 49 pgs.

Preliminary Report on Patentability dated Nov. 13, 2015 in Appln No. PCT/US2014/041023, 7 pgs.

Preliminary Report on Patentability dated Dec. 14, 2015 in Appln No. PCT/US2015/017872, 7 pgs.

PCT Written Opinion dated Feb. 11, 2016 in Appln No. PCT/US2015/021921, 7 pgs.

* cited by examiner

| Example NL Sentence | Predicted IntentAction | True IntentAction | Predicted IntentObject | True IntentObject | Predicted Intent |
|---|---|---|---|---|---|
| I want to see the schedule of Michigan State's Football Team | get | get | game | schedule | get_game |
| Show available seats for Chicago Bulls playoff game | find | find | game | tickets | find_game |
| Show Dwayne Wade Jumpshot pics | get | get | photos | photos | get_photos |
| Send me information about today's game | get | get | person_info | news | get_person_info |

FIG. 6

Mobile Computing Device

BUILDING CONVERSATIONAL UNDERSTANDING SYSTEMS USING A TOOLSET

BACKGROUND

Conversational understanding (CU) systems are used for a variety of different applications. For example, CU systems have been developed to allow users to search for content, buy items, obtain directions, and the like. The CU development process uses experts, such as scientists and computational linguists, in each step of the CU building process. For example, experts are used in the labeling of the data used when creating a CU application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Developers may build Conversational Understanding (CU) systems with the aid of assets and tools that are available in a CU service or platform. The tools and assets are provided to allow developers to enable applications for CU and to interact with and extend the CU service. The tools include a variety of different tools, such as, but not limited to: labeling tools, training tools, validation tools, and the like. The tools may be used to select coverage from existing domains, extend the coverage of one or more domains, as well as to create new domains in the CU service. For example, a developer may select one or more Application Programming Interfaces (APIs) from one or more existing domains (e.g., weather, finance, news, sports . . . ) in the CU service to include in an application. A developer may provide example Natural Language (NL) sentences that are analyzed by the tools to assist the developer in labeling data that is used to update the models in the CU service. For example, the tools may assist a developer in identifying domains, determining intent actions, determining intent objects and determining slots from example NL sentences. The tools automatically determine possible labels for the example NL sentences and allow the user to create new domains, intent actions, intent objects and slots. For example, the tools may be used by a developer to add their own tags for intent and slots or select automatically determined tags. After the developer tags all or a portion of the example NL sentences, the models in the CU service are automatically updated and validated. For example, validation tools may be used to determine an accuracy of the model against test data.

BRIEF DESCRIPTION OF THE DRAWINGS

FIG. 6 shows an example table of using existing domains to add a new domain to a conversational understanding system by re-using intents (or intent actions and/or objects) from existing domains;

DETAILED DESCRIPTION

Figure 1:
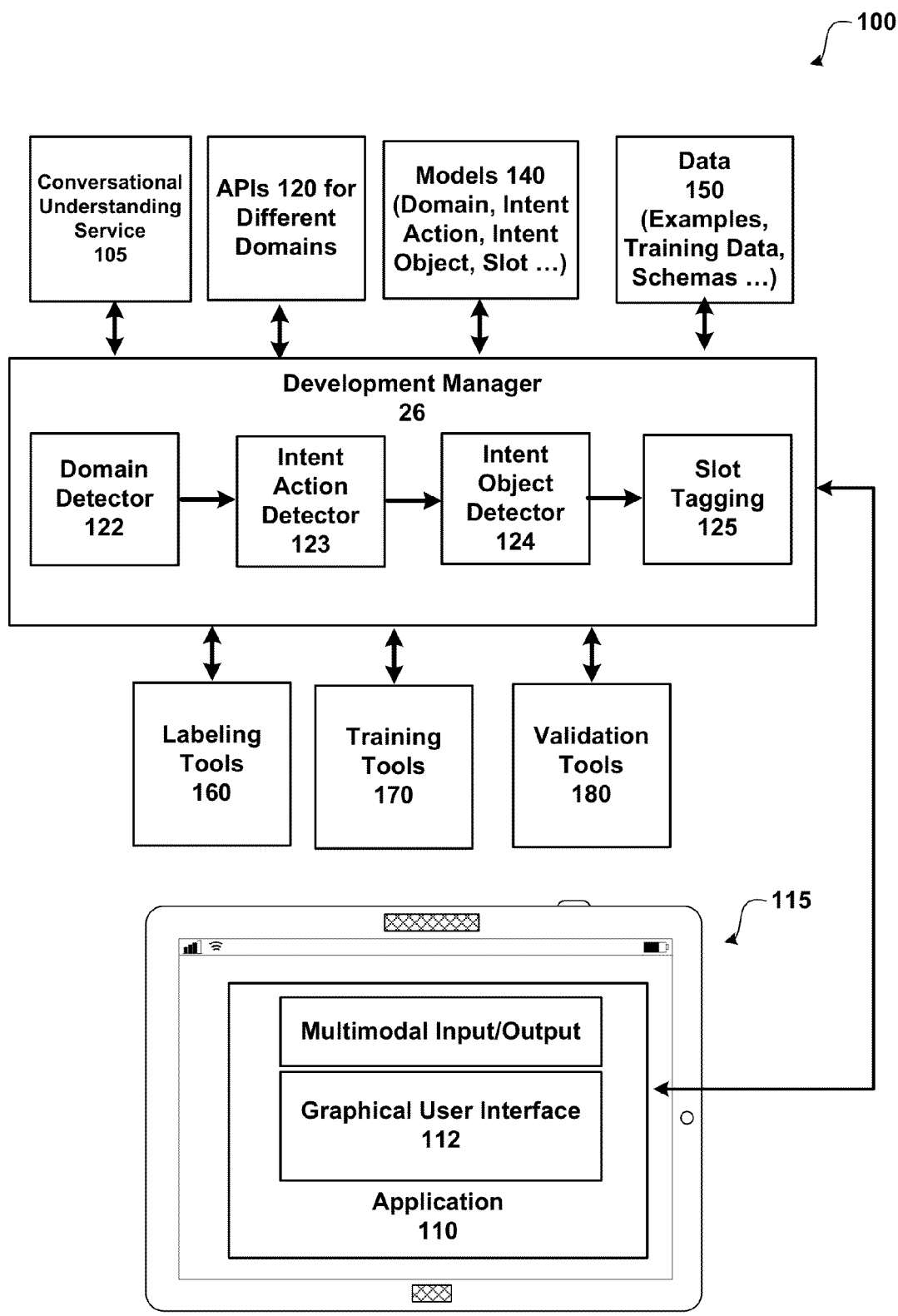
FIG. 1 illustrates a system that includes tools for a developer to create applications to interact with a conversational understanding service.

Referring now to the drawings, in which like numerals represent like elements, various embodiment will be described.

FIG. 1 illustrates a system that includes tools for a developer to create applications to interact with a conversational understanding service.

As illustrated, system 100 includes Conversational Understanding (CU) service 105, development manager 26, Application Programmer Interfaces (APIs) 120, models 140, data 150, labeling tools 160, training tools 170, validation tools 180, application 110 and touch screen input device 115.

Generally, Natural Language Understanding (NLU) in a goal-oriented CU service, such as CU service 105, is directed at identifying the domain(s) and intent(s) of the user, as expressed in natural language (NL), and to extract associated arguments or slots. For example, in an airline domain, users often request flight information (e.g., "I want to fly to Boston from New York next week"). In the movie domain where users often search for movies using natural language and play them with natural language commands there are many different slot types (e.g., movie star, movie release date, movie rating, and the like). Traditional training of NLU systems uses queries that are manually labeled (domain, intent, and slots) by experts or automatically labeled and checked by an expert.

Development manager 26 is configured to provide tools that assist a developer in developing and building applications to interact with CU service 105. The tools include a variety of different tools, such as, but not limited to: labeling tools 160, training tools 170, validation tools 180, and the like.

The different tools may be used to select coverage from existing domains, extend one or more domains, as well as to create new domains for interacting with a CU service. For example, a developer may select one or more Application Programming Interfaces (APIs) 120 from one or more existing domains (e.g., weather, finance, news, sports . . . ) in CU service 105 that are accessed by an application. Generally, a domain is an area that is associated with a set of actions (e.g., movie domain, music domain, book domain, game domain, flight domain . . . ) for which the CU service is trained to understand. Domains are typically related to a specific area but may also include more than one area. A developer may also extend a domain or create a new domain in CU service 105 using the tools.

According to an embodiment, for each domain that is added to a CU service, a fixed number of existing models 140 is updated to reflect the newly added domain. According to an embodiment, the models include a domain model, an intent action model, an intent object model and a slot model. According to another embodiment, new models may be created when a new domain is added.

Data 150 includes data relating to creating and enabling an application for Conversational Understanding. According to an embodiment, the application interacts with CU service 105. For example, data 150 may include training data that is used to train the models of CU service 105, one or more schemas relating to CU service 105, example data (e.g. example NL sentences) used to extend an existing domain or create a new domain in CU service 105, and the like. According to an embodiment, data, such as training data, can be shared across domains and intents. For example, training data for intent actions may be common across a variety of different domains.

Labeling tools 160 may be used by the developer to assist in labeling the data for the desired domains, intents and slots. For example, the labeling tools 160 may be used by a developer to add their own tags for intent and slots. A developer may provide example NL sentences that are analyzed by the labeling tools to assist the developer in determining what existing domains, intent actions, intent objects, and slots to use as well as how to incorporate additional coverage into CU service 105. Labeling tools 160 automatically determine possible labels for the example NL sentences and allow the user to create new domains, intent actions, intent objects and slots. For example, the tools may be used by a developer to add their own tags for intent and slots or select automatically determined tags. The labeling tools 160 may use domain detector 122, intent action detector 123, intent object detector 124 and slot tagging component 125.

Domain detector 122 identifies the domains from different NL sentences. For example, a developer may provide example NL sentences that they would like coverage for in the CU service. Domain detector 122 may identify a single domain or multiple domains from the examples. For example, domain detector 122 may identify both a movie domain and a social domain from one example NL sentence and identify a movie domain from another example NL sentence. The domains that are detected from the examples may or may not already be supported by CU service 105. The results of domain detector 122 may be displayed in graphical user interface (GUI) 112.

Intent action detector 123 is configured to predict the intent action for the current example NL sentence. An intent action is the action to be performed (e.g. find, post, play, buy . . . ) in the example NL sentence. For example, intent action detector 123 may predict the intent action for a current NL sentence to be: a get action; a find action; a post action; a play action; and the like. The predicted intent action may be displayed to the developer in GUI 112 to determine if the predicted intent action is the desired action.

For each determined intent action, one or more intent objects are identified by intent object detector 124. An intent object is an object that relates to that determined intent action. The intent object is the object of the determined intent action (e.g. movie, picture, item . . . ). The results of intent object detector 124 may be displayed in graphical user interface (GUI) 112. According to an embodiment, the intent (i.e. the combination of the intent action and intent object) is determined from the current example NL sentence.

Slot tagging is performed by slot tagging component 125 using the determined domains, intent actions, and intent objects. Generally, slot tagging identifies what slots are associated with the words of a NL sentence. The example NL sentences may be automatically tagged using the predictions and then corrected by the developer when determined. For example, a developer may use GUI 112 to change the tagging. The results of slot tagging component 125 may be displayed in graphical user interface (GUI) 112.

Training tools 170 include different tools that can be used to update the models of CU service 105. For example, a developer may select a training tool to update one or more of the models with additional training data.

Validation tools 180 may be used by a developer to determine the accuracy of the updated models. For example, the validation tools 180 may be used to compare the results that are obtained using the models with expected results. The validation tools 180 may also be used by the developer to see if individual examples are processed correctly. The results may be corrected (e.g., by changing labels) when the validation tools 180 indicate that the results are not correct.

In order to facilitate communication with the development manager 26, one or more callback routines, may be implemented. According to an embodiment, application program 110 is a multimodal application that is configured to receive speech input and input from a touch-sensitive input device 115 or other input devices. For example, voice input, keyboard input (e.g., a physical keyboard and/or SIP), video based input, and the like. Application program 110 may also provide multimodal output (e.g., speech, graphics, vibrations, sounds . . . ). Development manager 26 may provide information to/from application 110 in response to user input (e.g., speech, gesture). For example, a user may say a phrase to identify a task to perform by application 110 (e.g., selecting a movie, buying an item, identifying a product . . . ). Gestures may include, but are not limited to: a pinch gesture; a stretch gesture; a select gesture (e.g., a tap action on a displayed element); a select and hold gesture (e.g., a tap and hold gesture received on a displayed element); a swiping action and/or dragging action; and the like. Gestures may also include optically captured gestures, such as: a wave gesture, a scroll gesture, a guide gesture, and the like. For example, a device, such as MICROSOFT KINECT may be used to detect gestures.

System 100 as illustrated comprises a touch screen input device 115 that detects when a touch input has been received (e.g., a finger touching or nearly teaching the touch screen). Any type of touch screen may be utilized that detects a user's touch input. More details are provided below.

Figure 2:
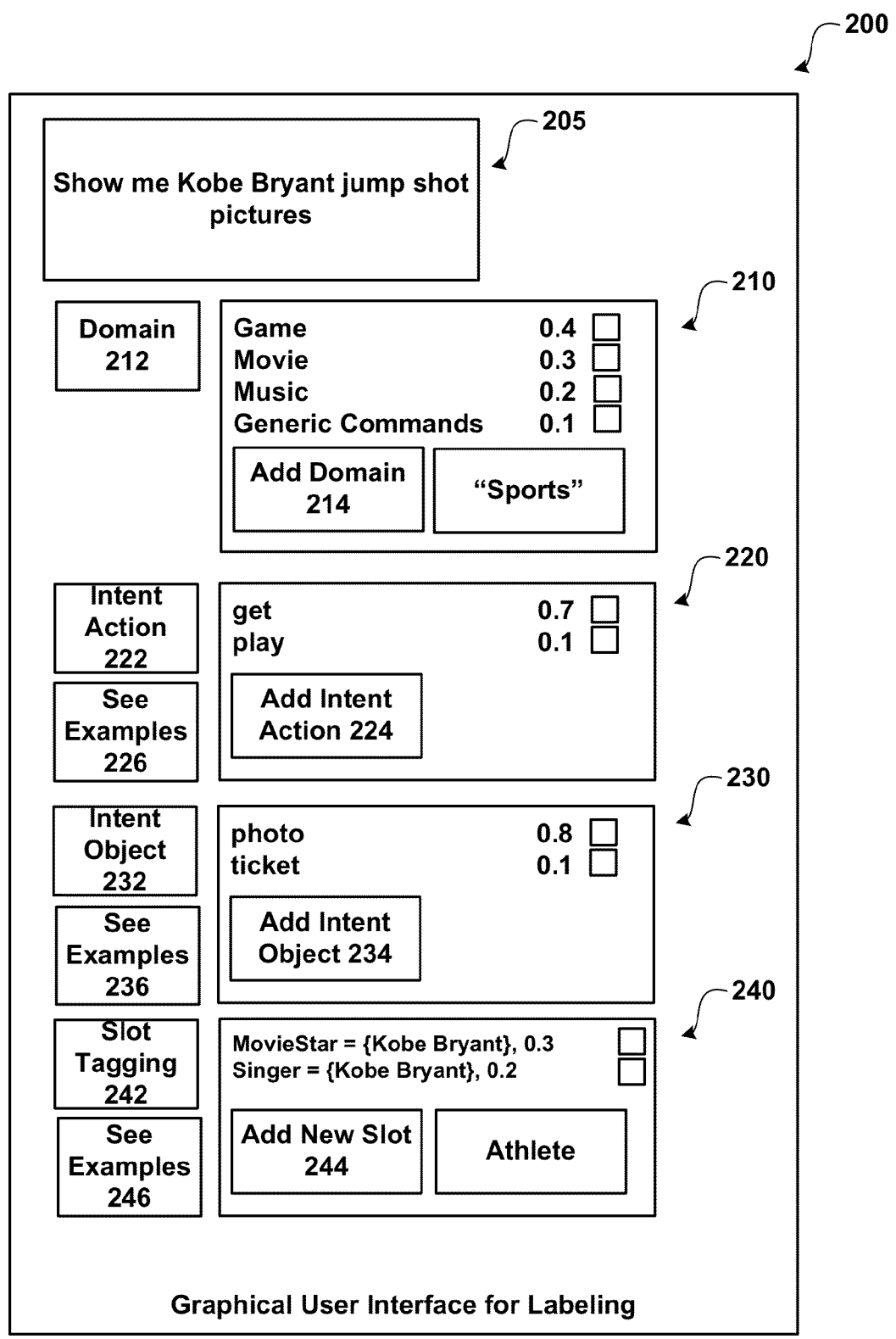
FIG. 2 shows an exemplary graphical user interface for labeling example NL sentences.

FIG. 2 shows an exemplary graphical user interface for labeling example NL sentences.

As illustrated, FIG. 2 shows graphical user interface (GUI) 200 that includes a current NL example sentence 205, a domain section 210, an intent action 220 section, an intent object 230 section, and a slot 240 section.

According to an embodiment, the CU service includes a set of models including a domain model, one or more intent models and a slot model that are trained for one or more domains. For purposes of explanation, the following example relates to a CU service that is trained for four different domains, including a Game domain, a Movie domain, a Music domain, and a Generic Commands domain. The data that is used to train the models for the CU service is annotated. As discussed above, labeling tools can be used by a developer to assist in labeling the data used to update the models.

In the current example, a developer has submitted example NL sentences that relate to sports and possibly other domains. Generally, the example NL sentences are sentences that are illustrative of how a user would interact with the application being developed. For example, in a sports application, the domains may include information that relates to a Sports domain, a Weather domain, a Movie domain, a Generic Commands domain, and the like.

Each of the example NL sentences submitted by the developer can be processed by labeling tools. Additional NL sentences may also be automatically generated using the example NL sentences. For example, the example NL sentences may be rephrased using a sentence rephrasing tool that automatically generates an enriched list of sentences which contain different ways of expressing the same meaning as the example NL sentences.

GUI 200 shows the processing of the example NL sentence 205 "Show me Kobe Bryant jump shot pictures."

Domain section 210 shows results from running a domain detector on example NL sentence 205. The domain detector may be automatically run or manually run. For example, the developer may select domain option 212 to run the domain detector. As illustrated, the domain detector identifies the domains from the available domains in the CU service that relate to the example NL sentence 205 and a confidence score for the domain. The confidence score provides an indication to a developer as to whether or not the domain is correctly identified for the example NL sentence. According to an embodiment, the confidence score ranges between 0 and 1, where a higher score indicates that the domain is more related to the example NL sentence as compared to a lower score. The developer can pick one of the suggested domains (e.g., by selecting the displayed box next to the domain) or add their own domain by selecting the add Domain option 214. In the current example, the developer has added a new "Sports" domain.

Intent Action section 220 shows results from running an intent action detector on example NL sentence 205. The intent action detector may be automatically run or manually run. For example, the developer may select intent action option 222 to run the intent action detector. In response to running the intent action classifier, the most likely intent actions (e.g., top N results) along with a confidence score is displayed. The developer may also select the see examples option 226 to see example NL sentences that use the displayed intent action labels that are already included in the models. The developer can compare the example NL sentence to the example sentences and decide to pick one of the suggested intent actions or the developer can choose to add his own intent action to label the example NL sentence. For example, the user may select the add intent action option 224.

Intent Object section 230 shows results from running an intent object detector on the example NL sentence 205. The intent object detector may be automatically run or manually run. For example, the developer may select intent object option 232 to run the intent object detector. In response to running the intent object classifier, the most likely intent objects (e.g., top N results) along with a confidence score are displayed. The developer may also select the see examples option 236 to view example NL sentences that use the displayed intent object labels that are already included in the model. The developer can compare the example NL sentence to the example sentences and decide to pick one of the suggested intent objects or the developer can choose to add his own intent object to label the example NL sentence. For example, the user may select the add intent object option 234.

Slot section 240 shows results from slot tagging the entities in example NL sentence 205. The slot tagging may be automatically run or manually run. For example, the developer may select slot tagging option 242 to run the slot tagging. In response to running the slot tagging, different detected slots (e.g., the top N results) along with a confidence score are displayed. The developer may also select the see examples 246 option to view similar slots that are already included in the model. The developer can either pick what is suggested or choose to highlight the sequences in the sentence and assign a new slot name by selecting the add new slot option 244. In the current example, the developer has created a new "Athlete" slot.

After performing the above steps for one or more of the sentences the platform automatically updates the models to make better suggestions to the developer for the next set of example NL sentences.

The proposed process biases the developers to label their data similarly to the already existing data.

Figure 3:
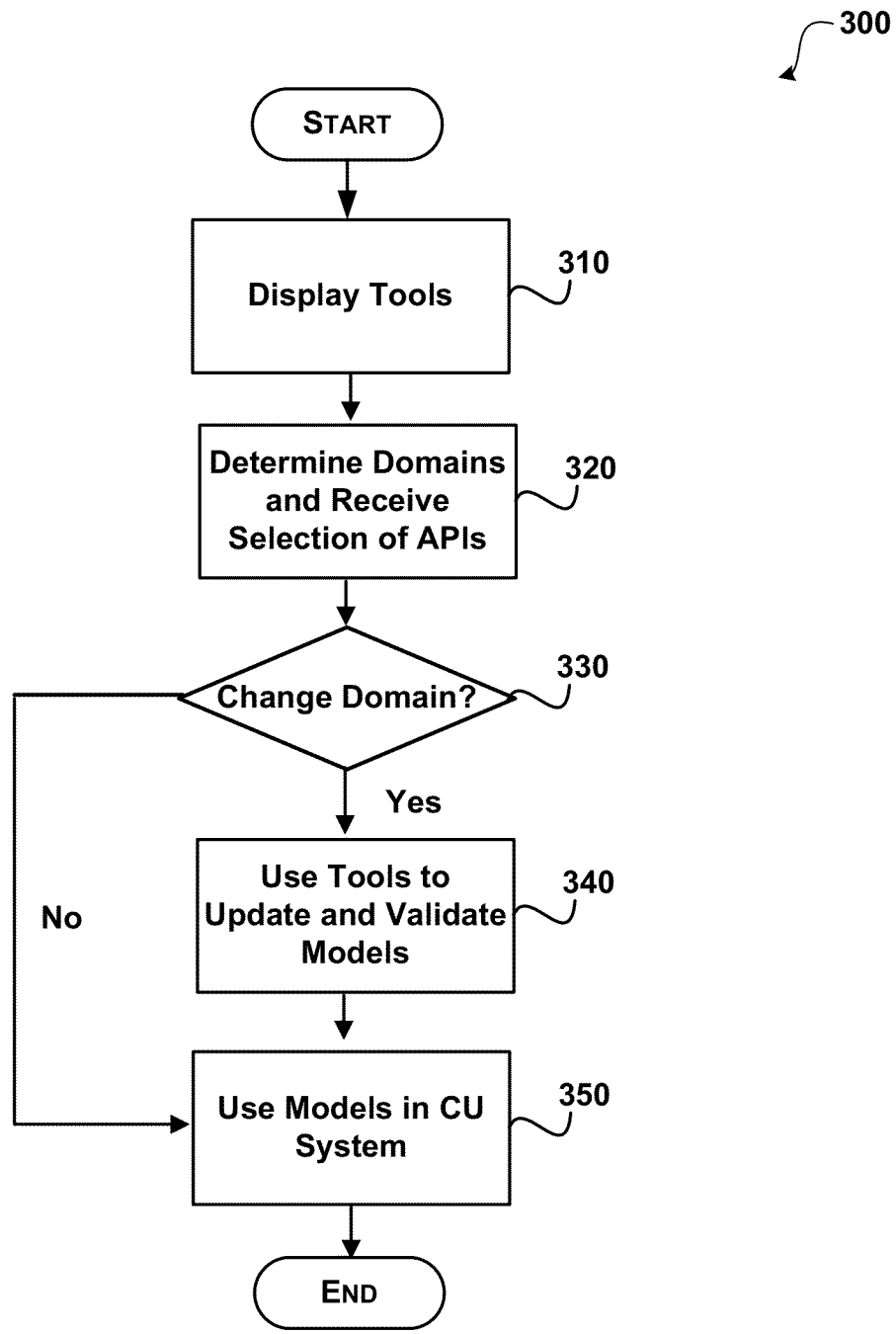
FIG. 3 shows a process for using tools to create an application to interact with a conversational understanding service.
Figure 4:
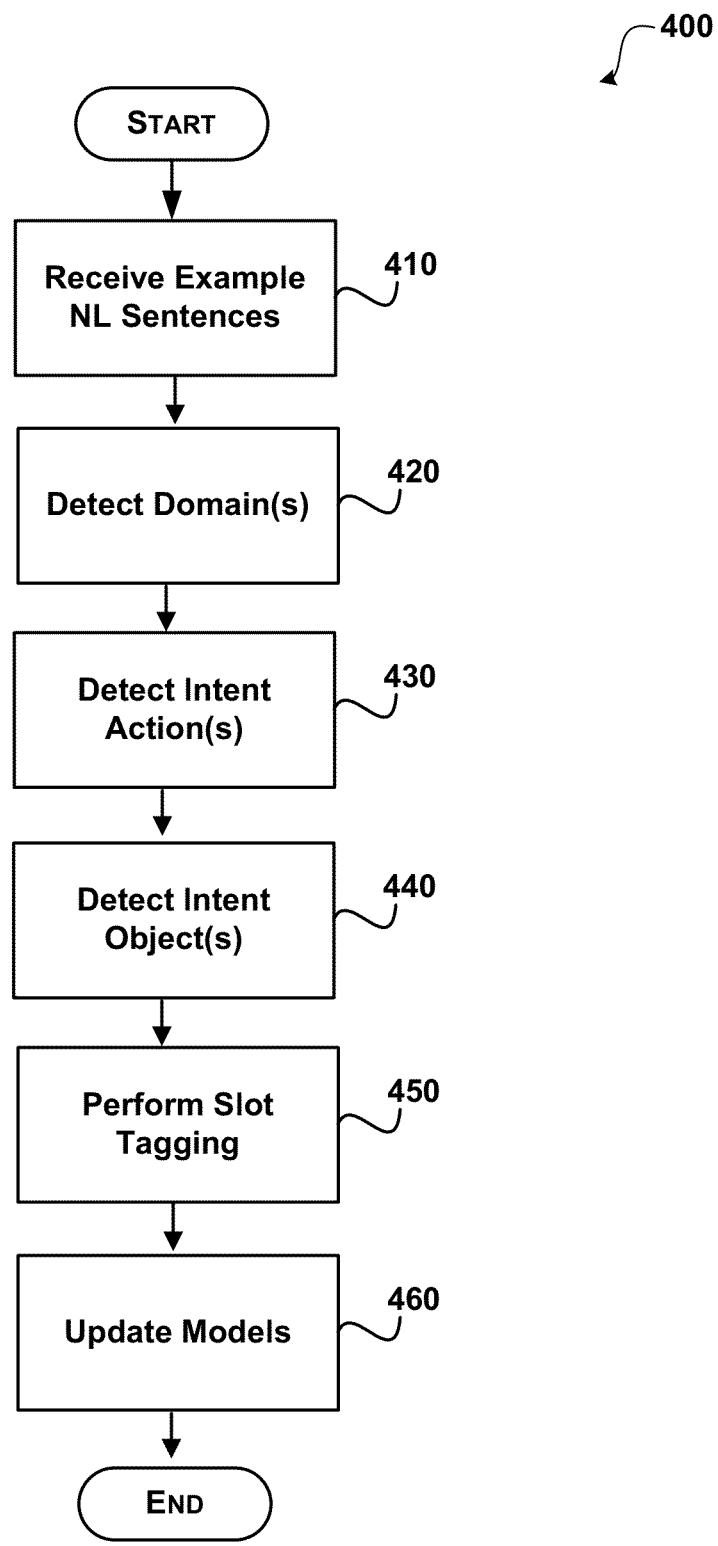
FIG. 4 shows a process for automatically detecting domains, actions, and objects from example natural language sentences to build customized models by mixing and matching domain models, intent models, or slot models or combining the underlying data to train new models.
Figure 5:
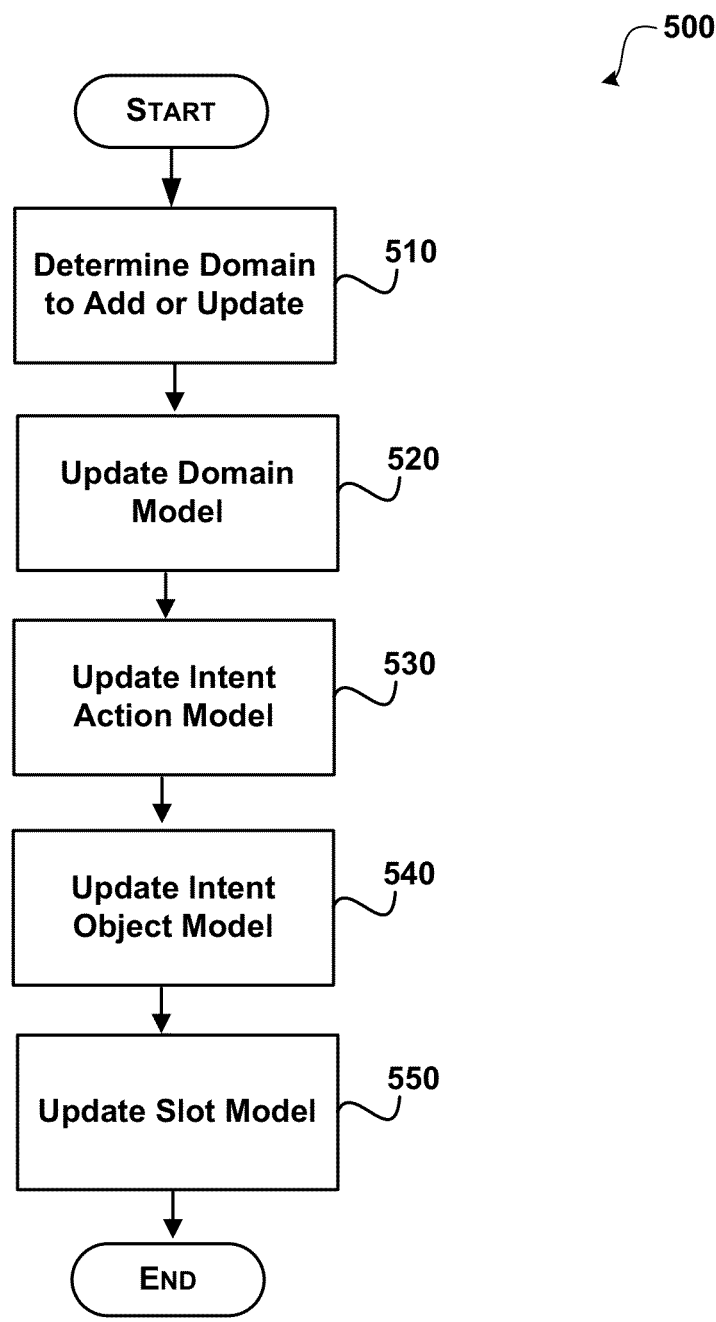
FIG. 5 shows a process for adding or updating a domain that is associated with a conversational understanding system.

FIGS. 3-5 illustrate a process for using tools to build a conversational understanding system. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 shows a process for using tools to create an application to interact with a conversational understanding service.

After a start operation, the process 300 moves to operation 310, where the tools to develop and enable a CU application are displayed. Tools are provided to allow developers to build applications to interact with Conversational Understanding (CU) systems and services. The tools include a variety of different tools, such as, but not limited to: selecting API tools, labeling tools, training tools, validation tools, and the like. The tools may be used to select functionality from existing domains, extend one or more domains, as well as to create new domains.

Transitioning to operation 320, the tools are used to determine what domains to use in the application as well as the corresponding APIs for the application. For example, a domain detector may be used to identify the existing domains in the CU service that relate to the application being developed. A user may also select one or more existing APIs that are associated with one or more domains.

Moving to decision operation 330, a determination is made as to whether there is an update to a domain or whether a domain is to be added to the CU system. When there is not either an update to a domain or a domain is not to be added, the process flows to operation 350. When there is an update to a domain or a domain is to be added, the process flows to operation 340.

At operation 340, the tools are used to update and validate the models. For example, labeling tools, training tools and validation tools may be used by the developer to update the CU service to include coverage for the application that is being developed.

Moving to operation 350, the models in the CU system are used by the application. The models may be used by one or more applications.

The process then flows to an end operation and returns to processing other actions.

FIG. 4 shows a process for automatically detecting domains, actions, and objects from example natural language sentences to build customized models by mixing and matching domain models, intent models, or slot models or combining the underlying data to train new models.

After a start operation, the process 400 moves to operation 410, where example NL sentences are received. The example NL sentences may be received in different forms. For example, the examples may be in a form of sentences or utterances. For example, an example NL sentence may be "find the most recent tom cruise movie." Another example may be "post this link on social network site X."

Flowing to operation 420, the domains associated with the example NL sentences are detected. Generally, a domain is an area that is associated with a set of actions (e.g. movie domain, music domain, book domain, game domain, flight domain . . . ). Zero or more domains may be detected depending on the domains that are already included in the domain model of the CU service. For example, a domain model may initially include one domain (e.g. movies) that is then extended to include another domain (e.g. social). More domains may be added or removed from the domain model. In the examples provided above, two different domains may be detected (e.g. movie and social).

Moving to operation 430, the output of the domain detection is used to determine the intent action(s) that are associated with each of the detected domains. One or more intent actions may be detected. An intent action is an action to be performed (e.g. find, post, play, buy . . . ). In the examples provided above, the intent actions detected include "find" and "post." The detected domains may or may not be used to assist in detecting any intent actions. The intent action domain may tag different intent actions according to the domain(s) the intent action is associated with. For example, the intent action "find" may be associated with many different domains (e.g. movie, games, books, flight, . . . ) whereas the intent action "post" may be associated with a single domain (e.g. social).

Transitioning to operation 440, the intent object(s) are detected. For each determined intent action, one or more intent objects are identified. An intent object is an object that relates to that determined intent action. The intent object is the object of the determined intent action (e.g. movie, picture, item . . . ). In the examples provided above, the intent objects detected include "movie" and "picture."

Flowing to operation 450, slot tagging is performed. One or more slot models may be used. In the examples provided above, the slots for the movie slot model include a ReleaseDate slot that is set to "most recent", a MovieStar slot that is set to "tom cruise", a MovieType slot that is set to "movie", and an ItemType slot that is set to "picture." The slots for the social media slot model include and a SocialMedia slot that is set to "X." Other domains may include other types of slots. For example, a travel domain may comprise slots for departure location, departure time, arrival time, arrival destination, travel method, constraints (e.g., lowest cost, no layovers, etc.). A dining domain may comprise slots for cuisine type, time, party size, reservation needed, and relative location (e.g., in walking distance, near a transit station, etc.). The developer may add one or more slots to a slot model. For example, the slot model for the travel domain may not include a slot for the travel method. Using the provided examples of tagging the utterance, the developer may create a new slot.

Moving to operation 460, models for the CU system are updated or customized. According to an embodiment, new models may be trained.

The process then moves to an end operation and returns to processing other actions.

FIG. 5 shows a process for adding or updating a domain that is associated with a conversational understanding system.

After a start operation, the process 500 moves to operation 510, where a domain to update or add to a CU service is determined. One or more models may be updated or created. According to an embodiment, four models are updated including a domain model, an intent action model, an intent object model and a slot model. According to another embodiment, two new models (intent and slot models) are created when a domain is added.

Flowing to operation 520, the domain model is updated with the new domain to add. For purposes of explanation, assume the understanding system currently supports four different domains (movies, music, games and generic commands) and that a sport domain is to be added. Instead of adding two new models to the understanding system, the existing domain model is updated to detect the new Sports domain when language relating to the Sports domain is located within a NL sentence.

Transitioning to operation 530, the intent action model is updated to support any new intent actions that are not already included in the intent action model. Many intent actions associated with the new domain may already be supported by the intent action model before being updated. For example, "get" and "find" intent actions that are associated with the sports domain may already be supported by the intent action model. Zero or more intent actions may be added to the intent action model (e.g. "schedule" . . . ).

Moving to operation 540, the intent object model is updated to support any new intent objects that are not already included in the intent object model. Many intent objects associated with the new domain may already be supported by the intent object model before being updated. For example, the intent objects already supported may include "game", "photos", "person information." Zero or more intent objects may be added to the intent object model (e.g. "news" . . . ).

Flowing to operation 550, the slot model is updated to support the new domain. According to an embodiment, a single slot model is used to support the domains. The slots may be associated with one or more different domains, actions and intents.

The process then moves to an end operation and returns to processing other actions.

FIG. 6 shows an example table of using existing domains to add a new domain to a conversational understanding system by re-using intents (or intent actions and/or objects) from existing domains.

For purposes of explanation, and not intended to be limiting, the models in the example CU service are trained using four different domains including a Movie domain, a Music domain, a Games domain and a Generic Commands domain. More or less domains may be used to train the models.

In the current example, a developer wants to add a new Sports domain to the CU service. According to an embodiment, the developer supplies example NL sentences. For each example NL sentence, the tools predict an intent action and an intent object.

Table 600 includes an example NL sentence column, a predicted intent action column, a true intent action column, a predicted intent object column, a true intent object column, and a predicted intent column. Table 600 shows four example NL sentences.

As can be seen by referring to table 600, the predicted intent actions are accurately predicted even though the sports domain is not part of the current CU service. In the current example, the predicted intent actions are the same as the true intent actions. The predicted intent objects are not as accurately predicted as compared to the intent actions, but they are reasonable.

In the first two NL sentences in table 600, the "game" intent object label from the Games domain is predicted as each of the first two NL sentences is related to a game or match.

The third NL sentence example shares the intent action and intent object with existing domains and is correctly predicted.

The fourth NL sentence example detected the right context of retrieving information using the "get person_info" although the true intent was to fetch "get_news".

As the number of covered domains in the CU service increases beyond the four in the current example, the predictions would become more accurate due to better coverage. From experimental results it was found that the automatically determined predictions are accurate over 90% of the time.

Figure 7:
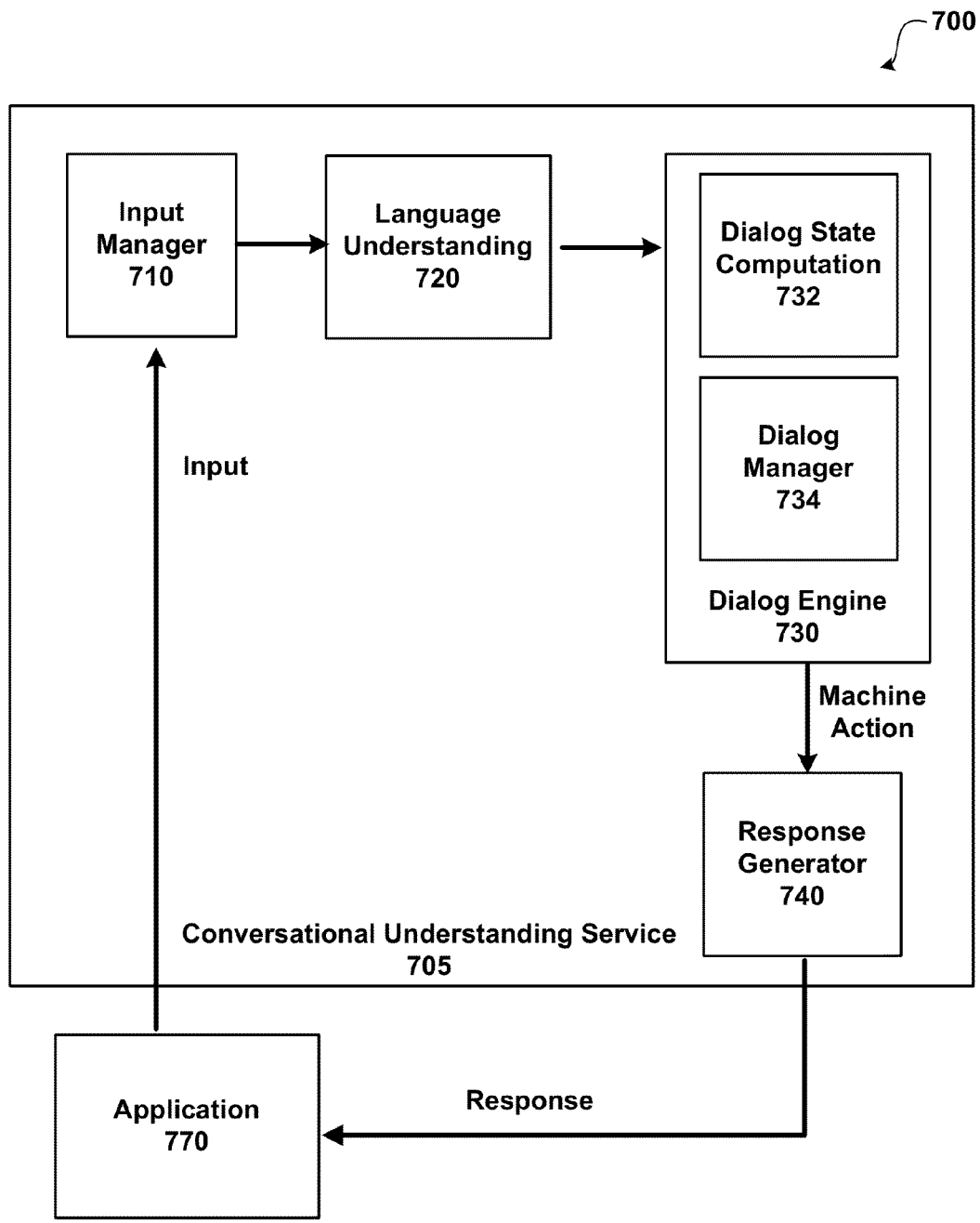
FIG. 7 illustrates a conversational understanding system interacting with an application using functionality created by a developer using provided tools.

FIG. 7 illustrates a conversational understanding system interacting with an application using functionality created by a developer using provided tools.

As illustrated, system 700 includes input manager 710, language understanding component 720, dialog engine 730, response generator 740, and application 770.

Application 770 is an application that is configured to interact with CU service 705 and was developed using the tools as described herein. Application 770 may include a natural user interface (NUI) or some other interface to interact with CU service 705. For example, a combination of a natural language dialog and other non-verbal modalities of expressing intent (e.g., gestures, touch, gaze, images, videos, spoken prosody, etc.) may be used to interact with service 705. As illustrated, CU service 705 receives speech utterances from application 770 and is configured to have a dialog with a user.

Input manager 710 is configured to receive input (the user dialog act) from application 770. The user dialog act may be different types of user input. For example, the user dialog act may be speech input (e.g., an utterance), touch input, gesture input, text input, as well as other types of input.

Input manager 710 may include different components, such as an Automatic Speech Recognizer (ASR), a gesture recognizer, a handwriting recognizer, and the like. When the user dialog act is speech, the speech is recognized by input manager 710 using ASR. Input manager 710 outputs text that is delivered to language understanding component 720.

Language understanding component 720 is configured to receive and analyze the text. Generally, language understanding component 720 associates a meaning to the words of the text. For example, language understanding component 720 may tag the text, perform a syntactic analysis of the text, and the like. The language understanding component 720 is traditionally a rules based component that converts natural language sentences into semantic representations.

Dialog engine 730 manages the dialog by determining a machine action in response to the user dialog act. Dialog engine 730 computes possible dialog states using dialog state computation component 732. Dialog manager 734 determines the machine action or machine actions. The dialog state information that is used by dialog manager 734 includes information for the current turn in the dialog as well as information for one or more past turns in the dialog. Dialog engine 730 provides the determined machine action to response generator 740.

Response generator 740 determines what type of response to provide the user. For example, response generator 740 may determine to provide a spoken response to the user or a visual response to the user. For example, a Text-to-Speech ("TTS") component may output the response as synthesized speech when determined Response generator 740 provides the response to the input to application 770.

Figure 8:
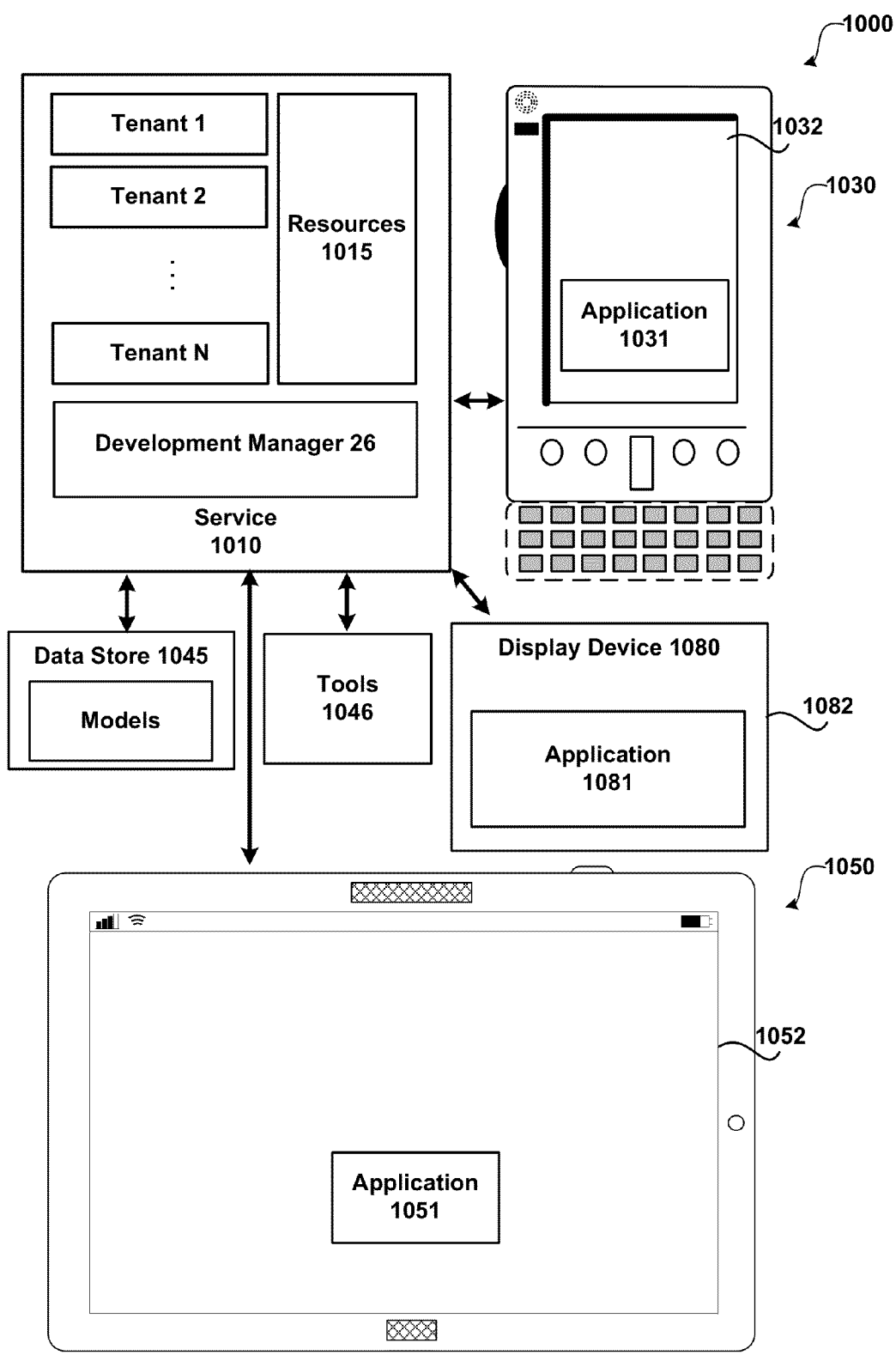
FIG. 8 illustrates an exemplary online system that provides tools for developing a conversational understanding application.

FIG. 8 illustrates an exemplary online system that provides tools for developing a conversational understanding application.

As illustrated, system 1000 includes service 1010, data store 1045, tools 1046, touch screen input device 1050 (e.g., a slate), smart phone 1030 and display device 1080.

As illustrated, service 1010 is a cloud based and/or enterprise based service that may be configured to provide services, such as dialog services as described herein. The service may be interacted with using different types of input and output. For example, a user may use speech input, touch input, hardware based input, and the like. Functionality of one or more of the services provided by service 1010 may also be configured as a client/server based application.

As illustrated, service 1010 is a multi-tenant service that provides resources 1015 and services to any number of tenants (e.g., Tenants 1-N). Multi-tenant service 1010 is a cloud based service that provides resources 1015 to tenants subscribed to the service and maintains each tenant's data separately and protected from other tenant data.

System 1000 as illustrated comprises a touch screen input device 1050 (e.g., a slate device) and smart phone 1030 that detects when a touch input has been received (e.g., a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g., a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input and output and each include an application (1031, 1051, 1081) that interact with service 1010 and were developed using tools 1046.

As illustrated, touch screen input device 1050, smart phone 1030, and display device 1080 shows exemplary displays 1052, 1032, and 1082 showing the use of an application. Data may be stored on a device (e.g., smart phone 1030, touch screen input device 1050 and/or at some other location (e.g., network data store 1045). Data store 1045, or some other store, may be used to store models, as well as other data. The applications used by the devices may be client based applications, server based applications, cloud based applications or some combination. According to an embodiment, display device 1080 is a device such as a MICROSOFT XBOX coupled to a display.

Development manager 26 is configured to perform operations relating to processes as described herein. Development manager 26 is configured to access tools 1046 that are used by a developer to create an application to interact with service 1010. While manager 26 is shown within service 1010, the functionality of the manager may be included in other locations (e.g., on smart phone 1030 and/or touch screen input device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
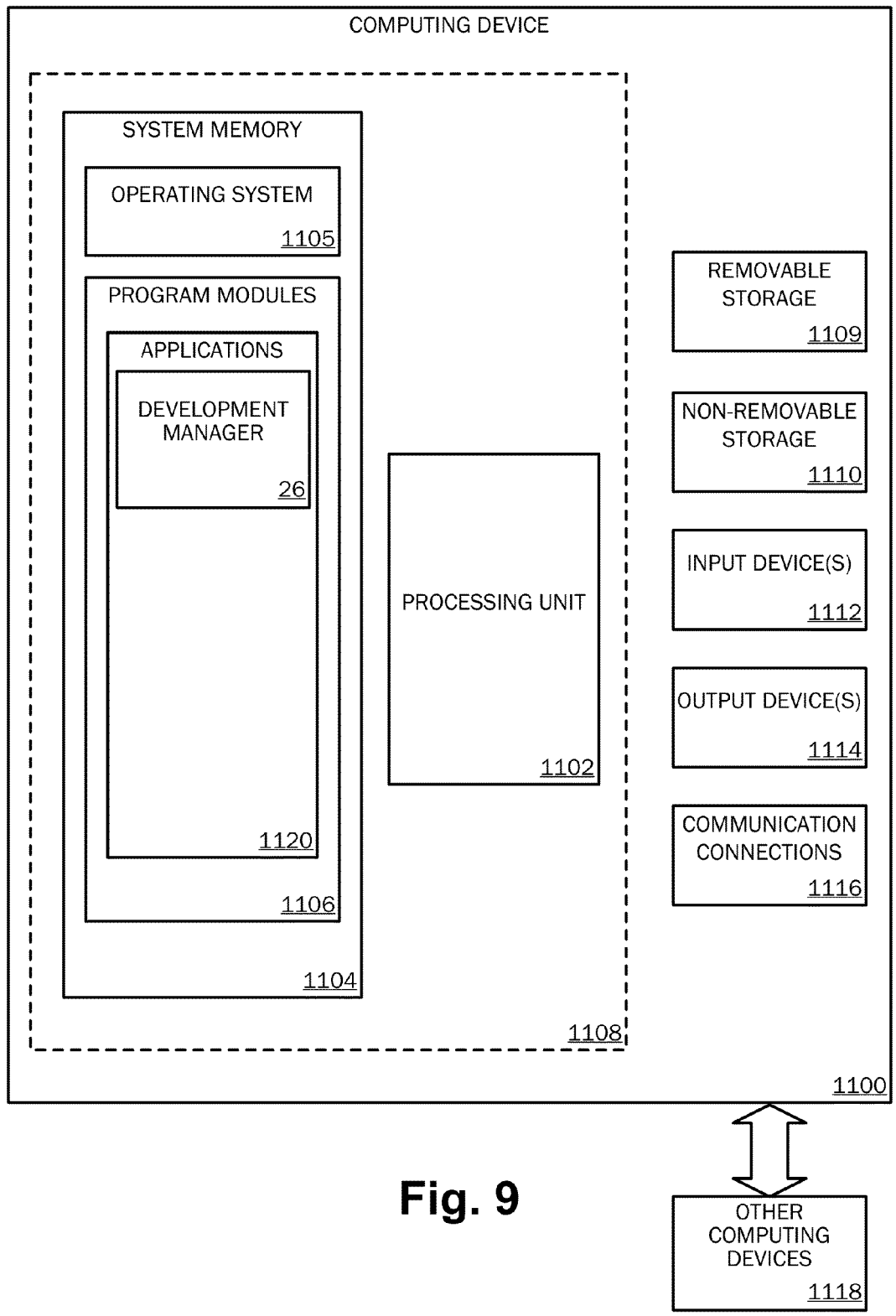
FIGS. 9, 10A, 10B and 11 and the associated descriptions provide a discussion of a variety of operating environments in which embodiments of the invention may be practiced.
Figure 10A:
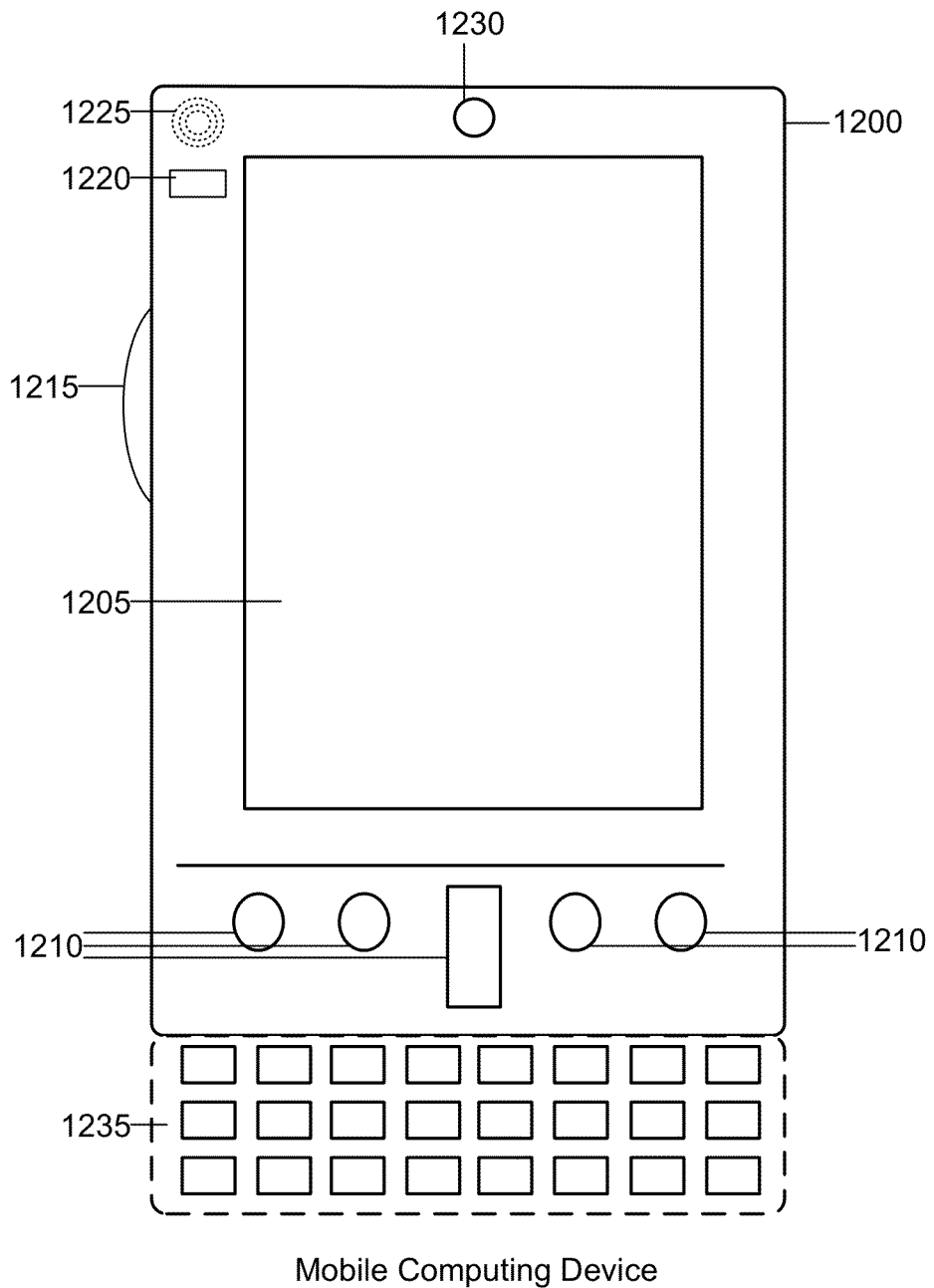
Figure 10B:
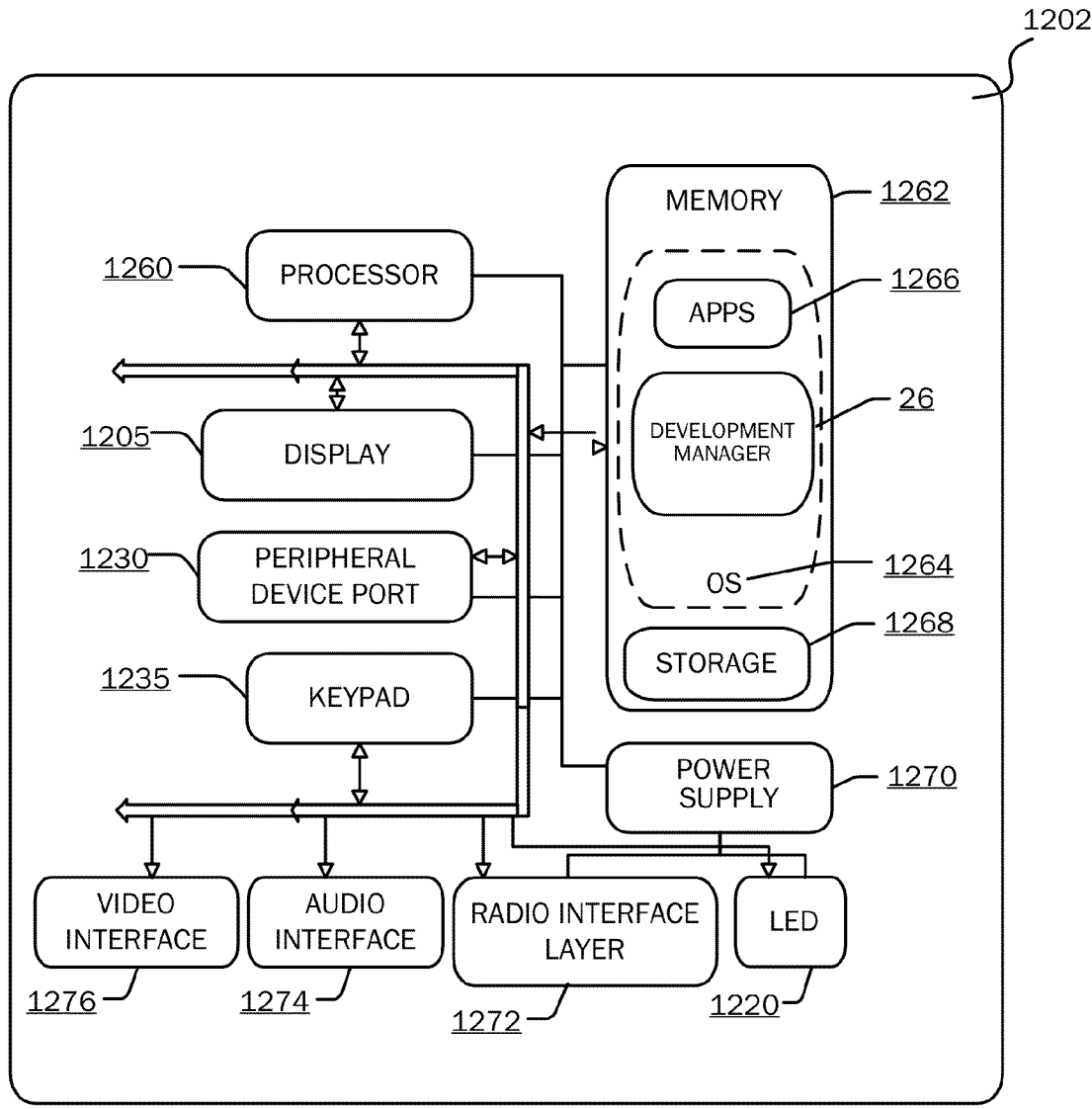
Figure 11:
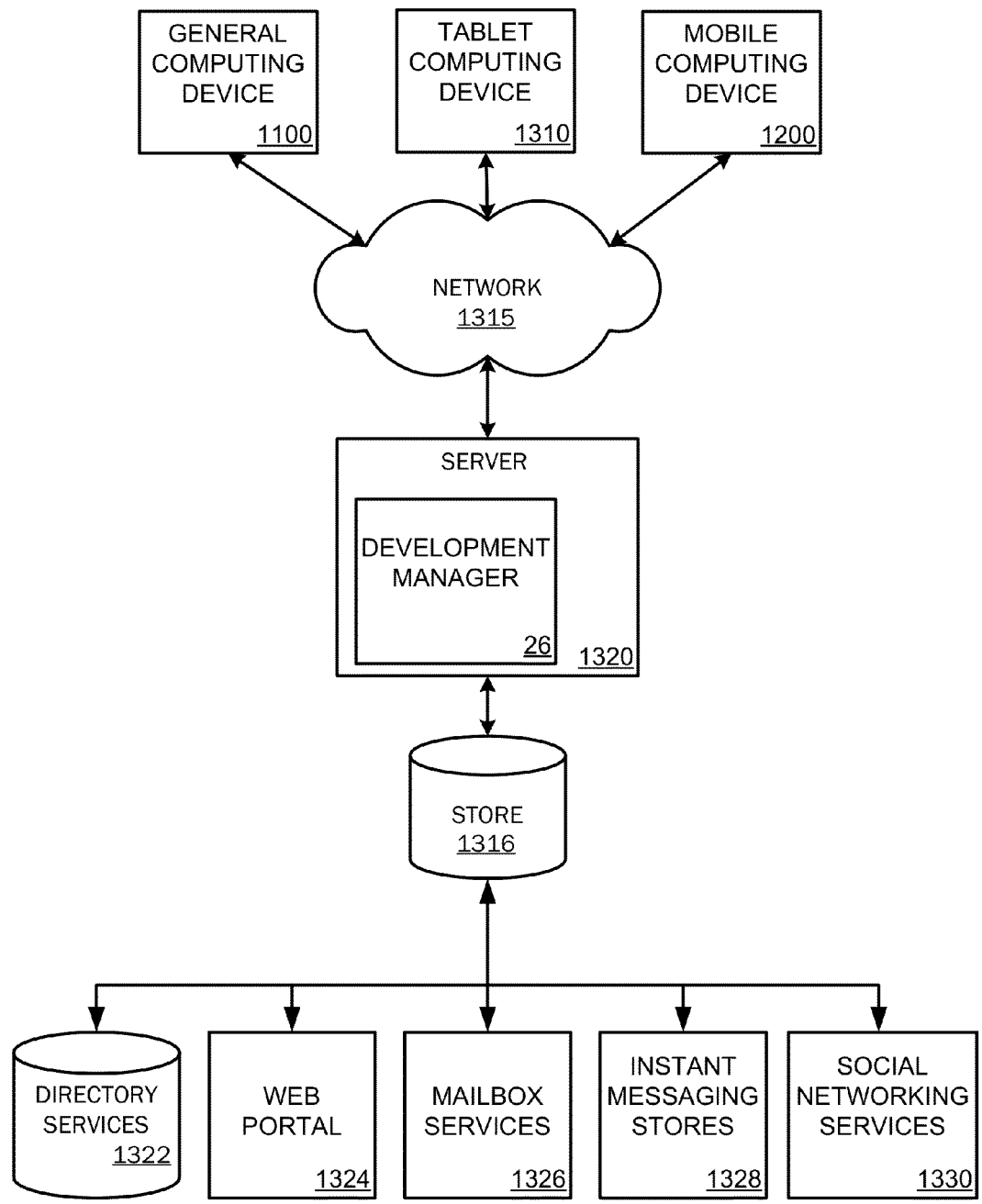

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the development manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 9 by a removable storage device 1109 and a non-removable storage device 1110.

As stated above, a number of program modules and data files may be stored in the system memory 1104. While executing on the processing unit 1102, the program modules 1106 (e.g., the development manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the development manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1200, for example, a mobile telephone, a smart phone, a tablet personal computer, a laptop computer, and the like, with which embodiments of the invention may be practiced. With reference to FIG. 10A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients, players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the development manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 10B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates an embodiment of an architecture of an exemplary system, as described above. Content developed, interacted with, or edited in association with the development manager 26 may be stored in different communication channels or other storage types. For example, various documents may be stored using a directory service 1322, a web portal 1324, a mailbox service 1326, an instant messaging store 1328, or a social networking site 1330. The development manager 26 may use any of these types of systems or the like for enabling data utilization, as described herein. A server 1320 may provide the development manager 26 to clients. As one example, the server 1320 may be a web server providing the development manager 26 over the web. The server 1320 may provide the development manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer implemented method for enabling an application for Conversational Understanding (CU) using assets in a CU service, comprising:
    receiving a selection of Application Programming Interfaces (APIs) that are associated with a domain to use in the application;
    automatically updating models for the CU service based on the selection of the APIs and the determined domain;
    receiving a Natural Language ("NL") expression, wherein the NL expression may be used to interact with the application;
    rephrasing the NL expressions to generate at least one additional expression, wherein the at least one additional expression contains a different, way of expressing a meaning of the NL expression; and
    automatic updating the models for CU service based on the rephrased NL expressions;
    making the models available to the CU service.

2. The method of claim 1, wherein determining the domain comprises receiving examples of natural language sentences used to interact with the application and automatically determining the domain using the examples.

3. The method of claim 1, further comprising determining the domain by applying a domain detector to examples to determine domains that currently exist in the CU service.

4. The method of claim 1, further comprising automatically detecting intent actions on example Natural Language sentences, displaying the detected intent actions and receiving a selection of one of the displayed intent actions or receiving a new intent action label.

5. The method of claim 1, further comprising automatically detecting intent objects on example Natural Language sentences and displaying the detected intent objects.

6. The method of claim 1, further comprising performing slot tagging based on detected intent actions and detected intent objects.

7. The method of claim 1, further comprising updating the models in the CU service for the application and validating the models.

8. The method of claim 1, further comprising incorporating the models into the CU service.

9. The method of claim 1, wherein the detected domain is sports.

10. A computer-readable storage medium storing computer-executable instructions for enabling an application for Conversational Understanding (CU) using assets in a CU service, comprising:
    receiving examples of Natural Language (NL) sentences used to interact with the application;
    detecting a domain, an intent action, and an intent object;
    receiving input to label the examples;
    automatically rephrasing the examples of the NL sentences to generate additional sentences that contain different ways of expressing a meaning of the NL sentences; and
    automatically updating models for the CU service based on the received input, wherein the updated models include the additional sentences.

11. The computer-readable medium of claim 10, wherein detecting the domain comprises applying a domain detector to the examples.

12. The computer-readable storage medium of claim 10, wherein detecting the intent action comprises detecting intent actions from the examples and displaying a confidence for each of the detected intent actions.

13. The computer-readable storage medium of claim 10, wherein detecting the intent objects comprises detecting intent objects from the examples and displaying a confidence for each of the detected intent objects.

14. The computer-readable storage medium of claim 10, further comprising performing slot tagging on the examples.

15. The computer-readable storage medium of claim 10, wherein automatically updating models for the CU service based on the received input comprises updating a domain model, an intent action model, an intent object model and a slot model.

16. A system for using tools to enable an application for Conversational Understanding (CU) using assets from a CU service, comprising:
- a processor and memory;
- an operating environment executing using the processor; and
- a development manager that is configured to perform actions comprising:
  - displaying a Graphical User Interface (GUI) that includes a display of tools used to enable the application;
  - receiving information to display a domain, an intent action, and an intent object, wherein the domain, the intent action, and the intent object has been detected from examples of Natural Language (NL) sentences used to interact with the application;
  - receiving information to display slot tagging, wherein the slot tagging has been performed on the examples;
  - displaying the detected domain, the intent action, the intent object and the slot tagging in the GUI;
  - receiving input from the GUI to label the examples; and
  - sending the received input for automatic updating of the models for the CU service based on the received input.

17. The system of claim 16, wherein detecting the domain comprises applying a domain detector to the examples to determine domains that currently exist in the CU service and displaying a confidence for each of the domains and receiving a selection of one of the domains or receiving a selection to add a new domain.

18. The system of claim 16, wherein detecting the intent action comprises detecting intent actions from the examples and displaying a confidence for each of the detected intent actions and receiving a selection of one of the intent actions or receiving a selection to add a new intent action.

19. The system of claim 16, wherein detecting the intent objects comprises detecting intent objects from the examples and displaying a confidence for each of the detected intent objects and receiving a selection of one of the intent objects or receiving a selection to add a new intent object.

20. The system of claim 16, wherein receiving the slot tagging comprises receiving a true intent of the examples of natural language sentences.

* * * * *